United States Patent

[11] 3,619,676

[72] Inventors Hiroshi Kawakami;
Juichi Tatsumi, both of Iruma, Japan
[21] Appl. No. 22,215
[22] Filed Mar. 24, 1970
[45] Patented Nov. 9, 1971
[73] Assignee Kabushiki Kaisha Yaskawa Denki Seisakusho
Yahata-ku, Kitakyushu-shi, Fukuoka-ken, Japan

[54] DUPLEX SERVOMOTOR
6 Claims, 5 Drawing Figs.
[52] U.S. Cl. ................................................ 310/112,
310/83, 310/209, 310/78, 310/268
[51] Int. Cl. .................................................. H02k 7/20
[50] Field of Search ........................................ 310/112,
83, 78, 76, 268, 209

[56] References Cited
UNITED STATES PATENTS
| | | | |
|---|---|---|---|
| 1,950,149 | 3/1934 | Lohmann | 310/112 X |
| 2,461,659 | 2/1949 | Rouse | 310/112 |
| 2,666,509 | 1/1954 | Jaggi | 310/209 X |
| 3,174,065 | 3/1965 | Jaun | 310/78 |

Primary Examiner—D. X. Sliney
Attorney—Ward, McElhannon, Brooks & Fitzpatrick

ABSTRACT: A duplex servomotor suitable for use in machine tools requiring automatic position control, feed control and the like, and other applications, which comprises a constant speed AC motor adapted to be coupled with a load to drive said load and a low-inertia DC servomotor adapted to be coupled with said load through speed reduction means and clutch means. The AC motor and DC motor are combined and arranged as a compact unit in a machine frame so that high-speed operation and low-speed operation can be independently transmitted to the load according to requirement.

DUPLEX SERVOMOTOR

BACKGROUND OF THE INVENTION

In the conventional table operation of any machine tool, ascent and descent operation of a hoist or crane, conveyor operation and the like, a high torque-low speed operation, low torque-high speed operation, and also an automatic positioning adapted to stop a tool at a predetermined position are required.

Hitherto, for the purpose of obtaining two kinds of high-speed and low-speed operations, it has been conventional to provide two motors having, respectively, reduction gearings reduction ratios of which are different from each other and to exchange coupling of the driving part with a load from one motor to another motor, or to adopt a machine in which high-speed and low-speed geared motors are provided in a machine frame so that their driving shafts are perpendicular to each other or in parallel and coupling of the driving part with a load is exchanged from one motor to another motor or vice versa. However, in both cases mentioned above, since two kinds of AC electric motors are used and speed control is achieved by varying the reduction ratio of the reduction mechanism, size and weight of the overall structure of the machine becomes large and requirements relating to precise speed control and accurate positioning and stopping of a driven member cannot be effectively satisfied.

On the other hand, in the case where the above-mentioned speed control is to be carried out by means of a DC motor, only one variable speed DC motor is necessary, but a relatively large speed control device is required for said motor, because the speed control should be satisfactory over a wide range from a low speed to a high speed. That is, as shown in FIG. 1, in spite of the fact that speed adjustment over a certain range $(v_1-v_2)$ is required for low-speed driving, only a predetermined speed $v_3$ is required in the case of high-speed driving thereby to cause wastefulness of a control device capable of achieving speed adjustment over a high-speed range, thus causing increase of capacity of the control device.

For example, in the case of feed operation of a machine tool the cutter feed speed range and noncutting fast feed speed range required for positioning the servomotor are relatively different. Consequently, if the cutter feed speed range $(v_1-v_2)$ and the noncutting fast feed speed range $(v_3)$ are, respectively, (5–1,000) mm./minute and 5,000 mm./minute, then in the case where one DC motor is used and its horsepower corresponding to the maximum cutter feed speed of 1,000 mm./minute is 1 hp., use of a DC motor of 5 hp. is required in order carry out a driving corresponding to the fast feed of 5,000 mm./minute. In practice, however, during the course of fast feed driving there is no cutting torque and only a torque $T_1$ corresponding to about half of the torque $T_2$ during low-speed driving is necessary. Therefore the speed control range of 1,000–5,000 mm./minute and about 2.5 hp. is not used and not necessary.

SUMMARY OF THE INVENTION

Therefore, an essential object of the invention is to provide a duplex servomotor free from the above-mentioned disadvantages of the conventional servomotors adapted for machine tools, hoists or cranes, conveyors and the like.

The above and other objects of the invention have been attained by an improved duplex servomotor comprising an AC motor adapted to drive a load and a low-inertia DC servomotor which are combined as one compact unit in a frame member. The capacity of said AC motor and control range and capacity of said DC servomotor being, respectively, less than the conventional cases.

The foregoing objects, function and characteristic features of the invention will become apparent by the description in conjunction with the accompanying drawing, in which the same or equivalent members are designated by the same numerals.

DETAILED DESCRIPTION OF THE INVENTION

Figure 3:
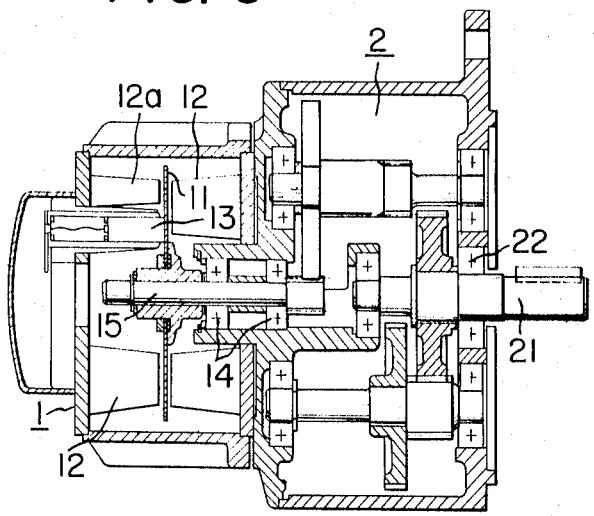
FIG. 3 is a sectional view of the low-inertia DC servomotor of the example of FIG. 2.
Figure 1:
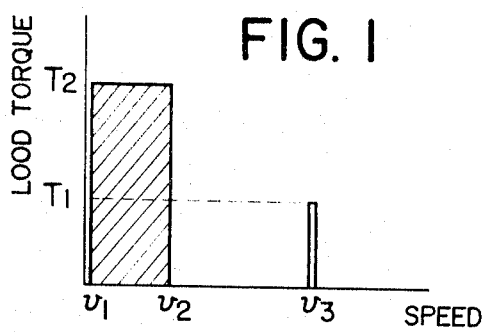
FIG. 1 is a schematic diagram showing relations between load torques and various speeds in the case where high-speed operation and low-speed operation are carried out by one variable speed DC motor.

In FIG. 3, a print motor device PM is shown, said device comprises a low-inertia DC servomotor 1 and a reduction gearing 2. The DC servomotor 1 comprises a plate-shaped armature 11 provided with coils printed thereon, magnetic poles 12 and 12a made of a permanent magnet and supported by the machine frame so as to be, respectively, confronted with both surfaces of said armature 11, a brush 13 adapted to supply an armature current to the coils of the armature 11, and a rotary shaft 15 supported by bearings 14. The reduction gearing 2 comprises a rotary shaft 21 supported by bearings 22 so as to be coaxial with the rotary shaft 15.

Figure 2:
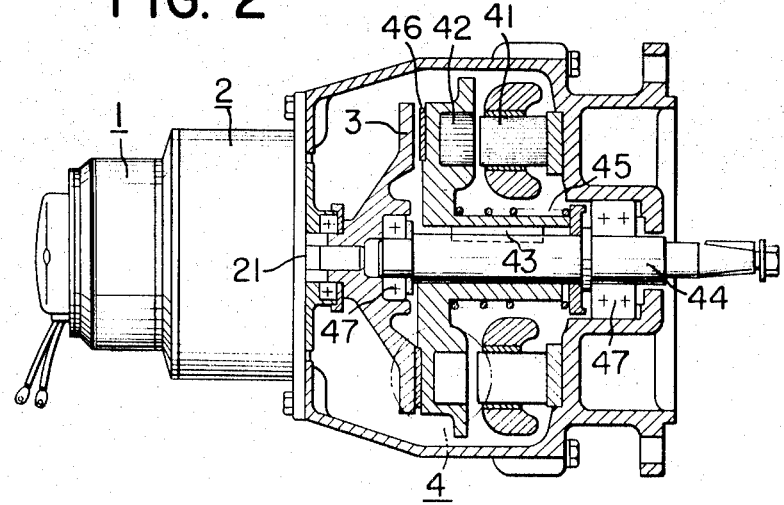
FIG. 2 is a side view of one example of the invention, in which the AC motor section is sectioned in vertical.

Referring to FIG. 2, an AC motor device AG comprises a clutch plate 3 attached to the rotary shaft 21 of the reduction gearing 2 and AC motor 4 such as a cage-rotor-type induction motor. The AC motor 4 comprises a stator 41 fixed to a stator frame, a rotor 42 being confronted with said stator through an axial airgap, a load shaft 44 on which said rotor 42 is engaged through a key 43 so as to be axially slid, bearings 47, a lining 46, and a support spring 45 adapted to separate said rotor 42 from said stator 41 and to push said rotor 42 toward the clutch plate 3.

Operation of the example illustrated in FIG. 2 will be described hereinafter.

In the case when the load shaft 44 is to be driven at a high speed, the AC motor 4 is energized, whereby the rotor 42 is attracted by magnetic attraction force of the stator 41 against the urging force of the spring 45 and is thereby separated from the clutch plate 3, thus causing high-speed driving of the load shaft 44 by only the AC motor 4.

On the other hand, in the case when low-speed driving of the load shaft 44 is to be carried out, only the DC servomotor 1 is excited without energization of the AC motor 4, whereby the rotary shaft 21 is driven at a low speed through the reduction gearing 2 by means of the rotary shaft 15 of the DC servomotor 1. In this state, since the rotor 42 of the AC motor 4 is brought in contact with the clutch plate 3 by the urging force of the spring 45, the rotor 42 is rotated at a low speed through said clutch plate 3, thus causing low-speed rotation of the load shaft 44. Of course, during this low-speed operation speed adjustment over a range $(v_1-v_2)$ can be easily attained in accordance with control range of the DC servomotor by means of a control device provided on said DC servomotor, (not shown).

In the case when the operation is exchanged over from a high-speed driving to a low-speed driving in a continuous manner, the magnetic attraction force of the stator 41 disappears upon breaking of the energization of the AC motor, whereby the rotor 42 is brought in contact with the clutch plate 3 by means of the spring 45 and the rotor 42 rotates owing to inertia thereof. Accordingly, there occurs the drawback that much heat energy is produced in the clutch plate 3 due to its kinetic energy, and the armature 11 of the DC servomotor is excessively accelerated through the reduction gearing 2, thus causing dangerous abnormal high-speed rotation of the armature 11. For reducing this drawback, in the case when operation is changed over from high-speed driving to low1speed driving dynamic braking is applied to the DC servomotor thereby to bring the operation into a low-speed driving condition while maintaining the speed within a range below a rated speed of the DC servomotor. In the case also when the operation is to be changed over from a high-speed operation to a stopped condition, the same braking as mentioned above is adopted. According to the invention, as clear from the above-mentioned description relating to the example of FIGS. 2 and 3, a constant speed AC motor adapted to be coupled with a load so as to drive said load and a low-inertia variable speed DC servomotor adapted to be coupled with said load through a reduction device and a clutch device are combined as a compact unit in a machine frame so that high-speed operation and low-speed operation can be independently transmitted to the load. Therefore, the AC motor can achieve a low torque, constant high-speed driving and the DC servomotor can achieve a high torque, adjustable low-speed driving through a reduction device. Accordingly, excessive increase of capacities of the motors is made unnecessary, speed control range of the DC servomotor is narrowed, and the control device is made simple and compact, thus achieving the advantage from and economical point of view of, compactness of the whole structure, and improvement of control accuracy.

Figure 4:
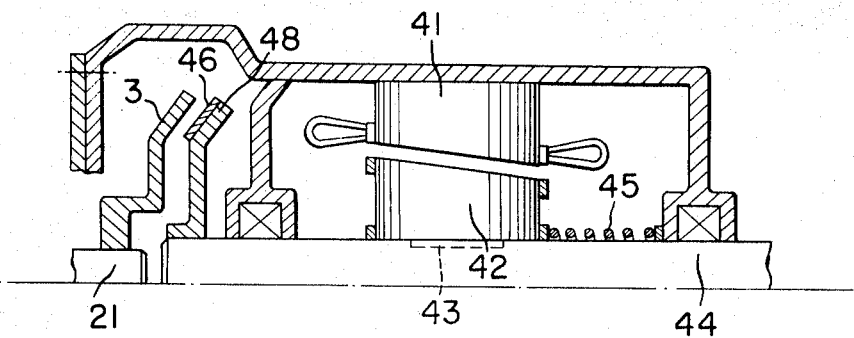
FIG. 4 is a sectional view of the main part of a cone-rotor-type motor which can be used as the AC motor in the present invention.

Furthermore, according to the invention, the rotor of the AC motor is axially shifted toward the clutch plate upon stoppage of said AC motor so as to become a driven member of the clutch plate. Thus the clutch operation necessary for exchanging speed range can be automatically carried out and therefore an AC clutch motor having a cone-rotor may be used as said AC motor. This cone-rotor-type motor being illustrated in its main part in FIG. 4, in which the same numerals as those in the example of FIG. 2 designate the same or equivalent members and a print motor device PM such as shown in FIG. 3 is omitted. In this example, a cone-shaped stator 41 and a cone-shaped cage rotor 42 are used as the stator and rotor of the AC motor, said rotor and the rotary shaft being axially slidable and urged leftward by means of a spring 45 as in the case of the example of FIG. 2, and a brake disc 48 having a lining 46 is attached to the rotary shaft 44, said brake disc being confronted with the clutch member 3. In the example of FIG. 4, if the stator 41 is excited, the rotor 42 and shaft 44 are brought in the position as shown against the leftward urging force of the spring 45, but upon cutting off of said excitation the rotor 42 and shaft 44 are shifted leftward, whereby the brake disc 48 is contacted with the clutch member 3, thus causing driving of the shaft 44 by the DC servomotor not shown through said clutch disc 3.

Figure 5:
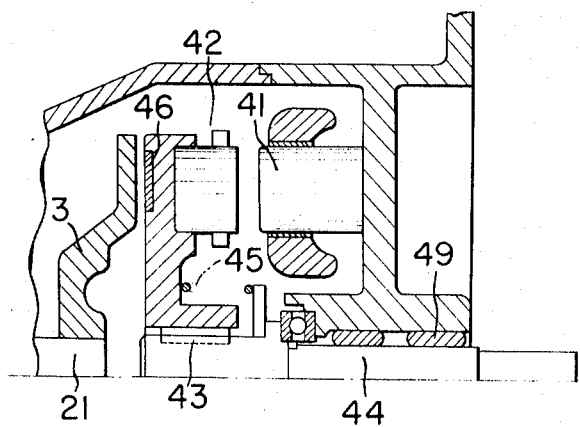
FIG. 5 is a sectional view of a modified portion of the AC motor in the example of FIG. 2.

FIG. 5 shows only a modified portion of the AC motor in the example of FIG. 2, in which the rotary shaft 21 is separated from the rotary shaft 44 and this shaft 44 is supported at one side thereof through a bearing 47 and a sleeve bearing 47.

In the example of FIGS. 2 and 3, a DC print motor 1 is used as the DC servomotor and its flat shape is utilized to align axial line of said motor with that of the AC motor, but a DC motor having a smooth surface armature may be effectively used as said DC servomotor with the same effect.

We claim:
1. A duplex servomotor which comprises:
    a constant speed AC motor having a fixed stator and an axially movable rotor;
    a load shaft coupled to said rotor;
    means urging said rotor axially from said stator to shift said rotor from said stator when said AC motor is deenergized;
    a DC servomotor; and
    clutch means interposed between said AC motor and said DC motor adapted to connect said DC motor to said load shaft when said AC motor rotor is shifted axially.
2. A duplex servomotor as claimed in claim 1, wherein the AC motor is a cone-rotor type AC motor having an axially shiftable rotary shaft connected to said clutch means and being shifted axially by said urging means to engage said clutch means upon deenergization of said AC motor.
3. A duplex servomotor as claimed in claim 1, wherein the DC motor is a printed-circuit-type motor.
4. A duplex servomotor according to claim 1 wherein said AC motor is an axial airgap-type motor and its rotor is a driven member of said clutch means.
5. A duplex servomotor according to claim 1 further including speed reduction means coupling said DC motor and clutch means.
6. A duplex servomotor according to claim 1 wherein said motors are arranged in axial alignment.

* * * * *